United States Patent [19]

Goeman

[11] 4,115,135

[45] Sep. 19, 1978

[54] COMPOSITION AND METHOD FOR PRODUCING GLASS REINFORCED CEMENT PRODUCTS

[75] Inventor: Friedrich Goeman, Stone Mountain, Ga.

[73] Assignee: W. R. Bonsal Company, Lilesville, N.C.

[21] Appl. No.: 832,013

[22] Filed: Sep. 9, 1977

Related U.S. Application Data

[63] Continuation-in-part of Ser. No. 705,884, Jul. 16, 1976.

[51] Int. Cl.$^2$ ................................. C04B 7/02
[52] U.S. Cl. .......................... 106/99; 106/314
[58] Field of Search ................ 106/99, 314, 315

[56] References Cited

U.S. PATENT DOCUMENTS

| | | | |
|---|---|---|---|
| 2,860,060 | 11/1958 | Benedict et al. | 106/314 |
| 3,038,094 | 7/1977 | Bondi | 106/99 |
| 3,373,048 | 3/1968 | Angstadt et al. | 106/315 |
| 3,429,724 | 2/1969 | Keenum et al. | 106/315 |
| 3,663,287 | 5/1972 | Mizunuma et al. | 106/314 |
| 4,002,482 | 1/1977 | Coenen | 106/99 |

*Primary Examiner*—J. Poer
*Attorney, Agent, or Firm*—Bell, Seltzer, Park & Gibson

[57] ABSTRACT

A cement mix suitable for mixing with water to form a glass reinforced cementitious material for use in high tensile strength applications such as surface bonding of concrete blocks or the like or in the formation of concrete products and characterized by a resistance to degradation of the glass reinforcement by the alkaline environment of the cementitious material. The cement mix comprises a dry mixture of an inorganic cementitious binder containing at least one reactive alkali compound, glass reinforcement fibers, and a water soluble salt of a metal selected from the group consisting of barium, lithium, and zinc.

13 Claims, No Drawings

COMPOSITION AND METHOD FOR PRODUCING GLASS REINFORCED CEMENT PRODUCTS

This application is a continuation-in-part of commonly assigned co-pending U.S. application Ser. No. 705,884, filed July 16, 1976 and entitled INHIBITORS FOR ALKALI GLASS REACTIONS IN GLASS REINFORCED CEMENT.

This invention relates to the utilization of glass as a reinforcement for cementitious articles, and more particularly to a composition, method, and product whereby attack and degradation of the glass reinforcement by the alkali content of the inorganic cementitious binder is eliminated or greatly reduced.

BACKGROUND OF THE INVENTION

The use of glass as reinforcement for cementitious materials such as concrete has been investigated for many years. Consideration has been given to the use of glass fiber rods to replace conventional steel reinforcement, as well as to the use of glass reinforcement in the form of fibers, flakes and woven or non-woven fabrics. Particular attention has been given recently to the use of glass fibers as a reinforcement for concrete and cement.

A serious obstacle in employing glass as a reinforcement in cement and concrete is the alkaline environment of the inorganic cementitious binder, which is highly deleterious to the glass and results in significant loss of strength in the reinforced cement or concrete products over a period of time, or even in total destruction of the glass reinforcement. Attack and destruction of the glass reinforcing properties is particularly rapid under humid conditions.

Prior approaches to overcoming the problem of alkali attack of the glass reinforcement have included the use of low alkali type cements, the use of coatings to protect the glass from the alkali, the use of specialized alkali resistant glass compositions, and the use of a cation exchange material to change the inorganic alkaline binder into a form which does not attack the glass. The most active areas of investigation appear to be the use of protective coatings for the glass and the development of alkali resistant glass compositions, as evidenced, for example by several very recent patents, e.g., U.S. Pat. Nos. 4,002,482, issued Jan. 11, 1977 and 4,013,478, issued Mar. 22, 1977.

However, the above-mentioned prior approaches have not been entirely successful in producing a practical, commercial glass reinforced cement composition. The limited availability and expense of the specialized materials required in these approaches renders the use of these materials unfeasible for many applications.

SUMMARY OF THE INVENTION

The present invention departs entirely from the above-noted traditional areas of investigation and research in protecting glass reinforcement fibers. Moreover, in accordance with the present invention it has been determined that certain water soluble salts, when incorporated in a cement composition containing glass reinforcing fibers, function most effectively to inhibit alkali attack upon the glass reinforcement fibers in the cement composition.

More particularly, in accordance with this invention it has been determined that water soluble salts of a metal selected from the group consisting of barium, lithium, and zinc, when mixed in finely divided particulate form with the dry cementitious binder and glass reinforcement, are highly effective to inhibit alkali degradation of the glass reinforcement when the cement mix is mixed with water and allowed to cure to form a cured glass reinforced cement product. The water soluble salt is preferably included in amounts of from about one-half to fifty percent by weight based upon the weight of the glass reinforcement.

In the aforementioned co-pending U.S. application, a cement composition is disclosed wherein a silica-containing scavenger material is incorporated in the cement mix to react with the alkali content of the cement and thereby protect the glass reinforcement from alkali attack. The aforementioned application also discloses incorporating into the cement mix, in addition to the silica containing scavenger inhibitor, water soluble salts of certain metals to serve as an inhibitor to undesirable alkali aggregate expansion reactions.

In accordance with the present invention it has been determined that certain of these water soluble metal salts, which were heretofore known to be effective to inhibit alkali aggregate expansion reactions in cement, function quite effectively in a glass reinforced cement composition to protect the glass reinforcement from the harmful alkaline environment of the cementitious binder.

The use of these water soluble metal salts in glass reinforced cement compositions in accordance with this invention permits the use of ordinary relatively inexpensive E-glass reinforcing fibers instead of the more expensive and sometimes unavailable alkali-resistant types of glass. It will be appreciated however, that the metal salts may also be beneficially used in cement compositions containing alkali resistant glass reinforcing fibers and will provide an enhanced degree of alkali resistance thereto.

The glass reinforced cement mix compositions in accordance with this invention are suitable for numerous applications, including use in high strength construction elements, cast or extruded concrete articles, and for surface bonding of concrete blocks or the like without the necessity of mortar between the blocks.

The inorganic binders used in accordance with the present invention may include Portland cement, masonry cement, mixtures of Portland cement and masonry cement, and mixtures of the foregoing with hydrated lime. The cement composition may also include aggregate fillers such as sand, and property-modifying additives such as pigments, plasticizers, water reducing admixtures, waterproofing admixtures, shrinkage compensators, set accelerators, retarders, gas forming agents, airentraining admixtures, and water retaining admixtures.

Some of the features and advantages of the invention having been stated, others will become apparent from the description and examples which follow, which are intended to illustrate and disclose, but in no way limit, the invention.

DETAILED DESCRIPTION OF THE INVENTION

The chemicals found effective to inhibit alkali attack upon the glass reinforcement in a glass fiber reinforced cement product are water soluble salts of a metal selected from the group consisting of barium, lithium, and zinc, and preferably the water soluble chloride, carbonate, nitrate, or acetate salt of such metal. Particularly preferred are barium chloride, zinc acetate, and lithium carbonate. The salt is incorporated into the cement mix by uniformly blending finely divided particles of the salt with the dry particulate cementitious binder and glass reinforcement.

Cement mixes for forming glass reinforced cement products are conventionally sold pre-packaged in bags. The water soluble salts found effective as inhibitors in accordance with this invention may be suitably mixed with the dry cementitious binder and glass reinforcement, packaged, stored for indefinite periods of time without loss of effectiveness as an inhibitor and without causing caking or lumping of the cement mix. The metal salt becomes active as an inhibitor when the cement mix is mixed with water and the composition is allowed to cure to form a cured cement product.

While the mechanism by which the water soluble metal salts function to inhibit alkali degradation of the glass reinforcement is not entirely understood, tests have determined that the metallic element becomes chemically attached or bonded to the glass in some manner, and that the glass is protected from alkali attack thereby. It is believed that the metal reacts with the alkali reactive silica of the glass to produce a metal-silica complex which forms an alkali resistant protective sheath or coating on all exposed surfaces of the glass and thus insulates the glass from further reaction with the alkali content of the cememt binder. It will be appreciated that since the reaction between the water soluble metal salt and the glass reinforcement occurs in situ while the glass reinforcement is distributed in the alkaline cementitious binder matrix, all alkali susceptible surfaces of the glass reinforcement are protected by the inhibitor. On the other hand, where a protective material is applied as a coating to glass reinforcement fibers as is done in accordance with many of the prior approaches as noted earlier, complete coverage of the glass fiber with the protective material cannot be achieved, since the protective material is normally applied to the continuous glass filaments prior to cutting into fibers and the end surfaces of the fibers are thus left unprotected.

In the cured glass reinforced cement product of this invention, the metal is present not only on the surface of the glass reinforcement fibers but also throughout the cement matrix, as a result of the water soluble metal salt having been blended with the alkaline cementitious binder prior to mixing of the cement and curing. The metal is thus available in the cement to provide additional protection to the glass reinforcement throughout the life of the glass reinforced cement product.

In this regard, it has been determined that under normal environmental conditions, the greatest amount of alkali degradation of the glass reinforcement occurs shortly after the cement is mixed. After several months of curing, the alkali remaining in the cement is relatively insoluble and non-aggressive, much of it having been neutralized by reaction with carbon dioxide in the atmosphere or with other materials in the cement.

However, where the cement product is used under severe conditions of high humidity and/or high temperature, the alkali may remain relatively active and aggressive for extended periods of time. Similarly, if the cement product is later exposed to these conditions, the relatively nonaggressive alkali may become reactivated. The metal which is distributed throughout the cement matrix in accordance with this invention is available to provide additional protection to the glass reinforcement, if and when the severe conditions occur.

The water soluble metal salts have been found to be effective in concentrations as low as about one-half percent by weight based upon the weight of the glass reinforcement. Concentrations as high as about fifty percent by weight may be suitably employed, although the rate of increase in effectiveness as a function of concentration appears to level out somewhat at concentrations exceeding about ten to fifteen percent, and for this reason, concentrations significantly exceeding this level are not economically attractive. The salt is most desirably used in amounts ranging from about one to about ten percent by weight based upon the weight of the glass reinforcement.

The alkaline inorganic binder employed in cement compositions in accordance with this invention may include masonry cement, Portland cement, mixtures of masonry cement and Portland cement, and mixtures of the above with hydrated lime. Portland cement is preferred and cements having an alkalinity as high as 1.5 percent by weight, based upon $Na_2O$, may be suitably employed in the compositions of this invention. Portland cements classified under ASTM specification C-150 as Type I cements have been tested and found particularly acceptable for the glass reinforced cement compositions of this invention.

The cement mix may also include the conventional types of fillers used in cement and concrete products such as gravel, sand, natural or manufactured aggregates, or crushed marble. Fine mineral aggregates (20 mesh or finer) are preferred in the compositions when chopped glass reinforcement fibers are used to obtain proper dispersion of the glass reinforcement fibers and optimum reinforcing function therefrom. The filler may be used in amounts ranging from 0 to 300 parts per 100 parts of dry cement binder.

Property modifying additives known in the cement and concrete industry as "admixtures" may also be included in the cement compositions. These are compounds or materials known to improve or alter the cement characteristics, and when used are generally incorporated in amounts of from about one percent up to about 20 percent by weight based upon the dry weight of the cement binder. Products classified as admixtures include pigments, water reducing admixtures, water retaining admixtures, airentraining admixtures, set accelerators, gas forming additives, waterproofing admixtures, expansion producing admixtures, shrinkage compensation admixtures, and plasticizers.

The glass reinforcement may be in the form of fibers, chopped yarns or rovings, flakes, rods, and woven or non-woven fabrics. Preferably however, the reinforcement is in the form of individual glass fibers or bundles of fibers chopped to a length of about one-fourth inch to 2 inches, most desirably about one-half inch. Fibers shorter than about one-fourth inch are considerably less effective as reinforcement, while fibers in excess of about 2 inches become entangled or form balls during mixing or otherwise do not maintain adequate dispersion throughout the cement matrix. Commercially available borosilicate Type E-glass may be suitably employed. However, other types of commercially available glass, such as the various alkali resistant types of glass may also be employed if desired. The amount of glass reinforcement employed is preferably within the range of 2 to 15 parts per 100 parts of dry cement binder, and most desirably within the range of 4 to 7 parts.

The dry cement mix compositions in accordance with this invention may be mixed with water and formed into various articles, including construction elements for use in applications requiring high tensile or compressive strength, cast or extruded concrete articles such as decorative veneers, concrete panels, concrete pipes or conduits.

The compositions are also particularly suitable as surface bonding cements for applying to the surface of a concrete block wall and the like for bonding the blocks together without the necessity of mortar between the blocks as has been customarily done in the past. The surface bonding cement provides a moisture resistant, stucco appearance on the surface of the wall and the thus bonded concrete blocks may be utilized for one or two stories, single and multi-family dwellings, warehouses and other commercial buildings up to two stories, below-grade basement walls, low-cost masonry units, farm buildings, and a variety of other applications. When the composition is employed as a surface bonding cement, it should be mixed with water to a creamy consistency and applied by spraying or by trowel to the surface of the stacked block or brick wall, preferably about one-eighth inch thick and up to one-fourth inch thick.

Exemplary compositions in accordance with this invention are as follows, the preferred composition being particularly suitble for use as a surface bonding cement:

|  | parts by weight | |
|---|---|---|
|  | (broad) | (preferred) |
| Portland cement | 100 | 100 |
| hydrated lime | 0–30 | 13–22 |
| fine sand aggregate | 0–300 | 100–160 |
| glass reinforcement fiber | 2–15 | 4–7 |
| inhibitor (Ba, Li, or Zn soluble salt) | 0.002–8.0 | .5–3 |
| admixtures | 1–20 | 1–20 |

To demonstrate the effectiveness of this invention, accelerated test methods were developed to quantitatively measure the reduction in alkali attack on glass fibers which is achieved by the addition of water soluble metal salts. The accelerated test specimens were subjected to electron microscopic examination of surface defects on the glass reinforcement fibers as well as to chemical analysis of rate and quantity of glass corrosion.

In most cases, the control specimen was an alkali resistant glass reinforcement fiber sold commercially as CEMFIL and produced by Pilkington Brothers, Ltd. or its licensees under U.S. Pat. No. 3,861,926. The CEMFIL fiber is of the following composition, in molecular weight percentages:

| $SiO_2$ | 62% to 75% |
|---|---|
| $ZrO_2$ | 7% to 11% |
| $R_2O$ | 13% to 21% |
| $R'O$ | 1% to 10% |
| $Al_2O_3$ | 0% to 4% |
| $B_2O_3$ | 0% to 6% |
| $Fe_2O_3$ | 0% to 5% |
| $CaF_2$ | 0% to 2% |
| $TiO_2$ | 0% to 4% |

Wherein $R_2O$ represents $Na_2O$ and up to 2 mol % $Li_2O$, and R'O is an oxide selected from the group consisting of the alkaline earth metal oxides, zinc oxide (ZnO) and manganese oxide (MnO).

The inhibitors were evaluated in combination with commercially available alkali susceptible E-glass fibers, which until now have not been recommended for use in alkali binders. Their composition is typically as follows:

| $SiO_2$ | 52.6% by weight |
|---|---|
| $Al_2O_3$ | 14.6 |
| CaO | 17.6 |
| MgO | 4.0 |
| $B_2O_3$ | 6.6 |
| $Na_2O$ | 1.4 |
| $K_2O$ | 1.9 |
| Organic Sizing | 1.3 |
|  | 100.0% |

These fibers are commercially available and manufactured by Johns Manville Company as code 308 reinforcing fibers.

EXAMPLE I

The CEMFIL glass and the code 308 E-glass fibers were exposed to an alkali solution of 1.0 N sodium hydroxide and the level of corrosion was determined by colorometrical quantitative analysis of the soluble silicates. In each instance 20 grams of the glass fiber was placed in polyethylene bottles with 200 ml of 1.0 N sodium hydroxide and maintained at temperatures of 75° F. and 120° F. for periods of 7 and 28 days. Table I gives the quantity of soluble silica of these specimens in mg/g at the specified times and temperatures.

TABLE I

|  | soluble silica (mg/g) | | | |
|---|---|---|---|---|
|  | 7 days | | 28 days | |
|  | 75° F | 120° F | 75° F | 120° F |
| (1) E-Glass Fiber Code 308A | 19.7 | 32.5 | 36.0 | 49.0 |
| (2) E-Glass Fiber Code 3535 | 8.4 | 41.5 | 46.0 | 64.0 |
| (3) AR-Glass OCF K 885 CA | 3.4 | 60.8 | 15.5 | 185.0 |
| (4) AR-Glass CEMFIL | .5 | 9.9 | 1.5 | 33.0 |

It is apparent that the alkali resistant glass fibers, while relatively resistant to alkali attack at room temperature, are very susceptible to alkali attack at elevated temperature. Calculating from the known original silica content of the fibers, the data of Table I represent a significant amount of glass fiber corrosion, as seen from Table II.

TABLE II

| Sample | $SiO_2$ Content | 28 day exposure to 1N $NaOH_2$ at 75° F % Glass attacked | at 120° F |
|---|---|---|---|
| 1 | 54% | 8.52% | 9.07% |
| 2 | 54% | 6.83% | 11.85% |
| 3 | 62% | 2.42% | 29.84% |
| 4 | 69% | 0.22% | 4.78% |

This example demonstrates that an effective inhibitor would be desirable not only in conjunction with E-glass reinforcing fibers, but also with the alkali resistant types of glass fibers, particularly where the alkali resistant fibers are subjected to severe conditions such as elevated temperature.

EXAMPLE II

The procedure of Example I was repeated with the addition of small amounts of soluble salts of barium, lithium, and zinc to the E-glass and alkali resistant glass fibers. The results are shown in Table III.

TABLE III

|  |  | Soluble Silicate (mg/g) | | | |
|---|---|---|---|---|---|
|  |  | 7 days | | 28 days | |
|  |  | 75° F | 120° F | 75° F | 120° F |
| E-Glass Fiber JM308 | no inhibitor | 19.7 | 33.0 | 46.0 | 48.0 |
|  | +1% BaCl$_2$ | 8.0 | 10.7 | 15.0 | 22.3 |
|  | +1% LiCO$_3$ | 10.3 | 15.5 | 19.0 | 20 |
|  | +1% Zn (CH$_3$COO)$_2$ | 9.8 | 10.2 | 20.0 | 22.8 |
|  | +5% BaCl$_2$ | 3.3 | 5.4 | 5.0 | 14.0 |
| AR glass Fiber | no inhibitor | — | 3.3 | — | 16.0 |
| CEMFIL | +10% BaCl$_2$ | — | 0.7 | — | 1.3 |
| E-glass Fiber Code 3535 | no inhibitor | — | 25.1 | — | 29.7 |
|  | +10% BaCl$_2$ | — | 3.7 | — | 3.8 |

This example clearly demonstrates that barium chloride, lithium carbonate, and zinc acetate, in concentrations as low as one percent, effectively inhibit alkali corrosion of both E-glass fibers and alkali resistant glass fibers.

EXAMPLE III

The procedure of Example I was repeated varying the amount of barium salt used as a percent of the weight of total glass. The test was done only at 120°. The results are shown in Table IV.

TABLE IV

|  | Soluble Silica (mg/g) 120° F | |
|---|---|---|
|  | 7 days | 28 days |
| E-Glass Code 308 no inhibitor | 21.6 | 22.8 |
| + 1% BaCl$_2$ | 15.0 | 22.3 |
| + 5% BaCl$_2$ | 5.0 | 14.0 |
| +10% BaCl$_2$ | 3.0 | 4.6 |
| +20% BaCl$_2$ | 2.0 | 2.5 |
| +30% BaCl$_2$ | 1.6 | 1.7 |
| +40% BaCl$_2$ | 1.3 | 1.5 |
| +50% BaCl$_2$ | 1.4 | 2.0 |
| +10% Ba(C$_2$H$_3$O)$_2$ | 3.5 | 4.2 |
| +10% BaCO$_3$ | 22.0 | 28.0 |
| +10% Ba(NO3)$_2$ | 3.8 | 4.2 |

It will be seen that the barium chloride addition is effective at levels as low as 1 percent and is highly effective at levels of 10 percent or greater. It will be further noted that barium carbonate, a water insoluble barium salt, is ineffective as an inhibitor.

EXAMPLE IV

A comparison was made of the effectiveness of various levels of soluble barium chloride by boiling E-glass reinforcement fibers in a Portland cement slurry with barium chloride added thereto at levels of 0%, 1%, 5% and 10% by weight based upon the glass fibers. After boiling for four hours, the fibers were removed from the slurry, washed, dried, and examined for corrosion and surface pitting by scanning electron microscope at 4000X magnification. The E-Glass fibers exposed to the Portland cement slurry without inhibitor showed serious surface corrosion. However, in those samples exposed to the slurry containing barium chloride inhibitor, no surface defects could be observed.

EXAMPLE V

Test panels ⅛ inch thick containing E-Glass reinforcement in a Portland cement-lime binder were prepared. Barium chloride was incorporated in three of the panels at concentrations of one percent, five percent and ten percent based upon the weight of the glass. A fourth panel serving as a control sample, contained no inhibitor. The test panels were exposed for 1,000 hours in an Atlas Weather-O-Meter. This exposure simulates accelerated weathering under high ultraviolet light and rain cycles with an intensity of one hour equals 24 hours outdoor exposure. After exposure for 1,000 hours, simulating approximately 30 months of exposure, the glass fibers were carefully removed and examined for possible surface defects by means of a scanning electron microscope at 5000X magnification. No surface defects were noticed in the three samples containing barium chloride, while the control sample without barium chloride showed definite surface pitting.

In the specification there have been set forth preferred details of the invention, and although specific terms are employed, they are used in a generic and descriptive sense only and not for purposes of limitation.

That which is claimed is:

1. In a method of making a glass reinforced cementitious material comprising the steps of adding water to a mixture of inorganic alkaline cementitious binder and glass reinforcement fibers, mixing the components, and allowing the mixture to harden and cure, the improvement which comprises inhibiting degradation of the glass reinforcement fibers in the alkaline environment of the cementitious binder by adding to the mixture of inorganic cementitious binder and glass reinforcement fibers, from one half to fifty percent by weight based upon the weight of the glass reinforcement fibers of finely divided particles of a water soluble salt of a metal selected from the group consisting of barium, lithium and zinc.

2. The method according to claim 1 wherein said water soluble salt comprises the chloride, carbonate or acetate salt of said metal.

3. The method according to claim 1 wherein said water soluble salt comprises barium chloride.

4. The method according to claim 1 wherein said water soluble salt comprises zinc acetate.

5. The method according to claim 1 wherein said water soluble salt comprises lithium carbonate.

6. In a method of making a glass reinforced cementitious material comprising the steps of adding water to a mixture of inorganic alkaline cementitious binder and glass reinforcement fibers, mixing the components, and allowing the mixture to harden and cure, the improvement which comprises using ordinary alkali susceptible E-glass for the reinforcement fibers and inhibiting degradation of the alkali susceptible glass reinforcement fibers in the alkaline environment of the cementitious binder by adding to the mixture of inorganic cementitious binder and glass reinforcement fibers, from one half to fifty percent by weight based upon the weight of the glass reinforcement fibers of finely divided particles of a water soluble salt of a metal selected from the group consisting of barium, lithium and zinc.

7. In a method of making a surface bonded wall comprising the steps of applying a coating of a surface bonding cement over at least one surface of an assembly of stacked concrete blocks and allowing the cement coating to harden and cure and serve to bond the blocks together without the necessity of mortar between the blocks, and wherein said coating of surface bonding cement comprises an inorganic cementitious binder containing at least one reactive alkali compound, glass reinforcement fibers distributed throughout the binder, and fine sand aggregate also distributed throughout the binder, the improvement which comprises inhibiting degradation of the glass reinforcement fibers in the alkaline environment of the cementitious binder by adding to the mixture of inorganic cementitious binder, glass reinforcement fibers, and fine sand aggregate, from one half to fifty percent by weight based upon the weight of the glass reinforcement fibers of finely divided particles of a water soluble salt of a metal selected from the group consisting of barium, lithium and zinc.

8. The method according to claim 7 wherein said water soluble salt comprises the chloride, carbonate or acetate salt of said metal.

9. The method according to claim 7 wherein said water soluble salt comprises barium chloride.

10. The method according to claim 7 wherein said water soluble salt comprises zinc acetate.

11. The method according to claim 7 wherein said water soluble salt comprises lithium carbonate.

12. In a method of making a surface bonded wall comprising the steps of applying a coating of a surface bonding cement over at least one surface of an assembly of stacked concrete blocks and allowing the cement coating to harden and cure and serve to bond the blocks together without the necessity of mortar between the blocks, and wherein said coating of surface bonding cement comprises an inorganic cementitious binder containing at least one reactive alkali compound, glass reinforcement fibers distributed throughout the binder, and fine sand aggregate also distributed throughout the binder, the improvement which comprising using ordinary alkali susceptible E-glass for the reinforcement fibers, and inhibiting degradation of the alkali susceptible glass reinforcement fibers in the alkaline environment of the cementitious binder by adding to the mixture of inorganic cementitious binder, glass reinforcement fibers, and fine sand aggregate, from one half to fifty percent by weight based upon the weight of the glass reinforcement fibers of finely divided particles of a water soluble salt of a metal selected from the group consisting of barium, lithium and zinc.

13. A cement mix suitable for mixing with water to form a glass reinforced cementitious material for use in high tensile strength applications such as surface bonding of concrete blocks or the like or in the formation of concrete products, and characterized by providing a resistance to degradation of the glass reinforcement by the alkaline environment of the cementitious material, said cement mix consisting essentially of:

|  | parts by weight |
|---|---|
| Portland cement | 100 |
| hydrated lime | 13–22 |
| fine sand aggregate | 100–160 |
| chopped glass fiber reinforcement | 4–7 |
| admixtures | 1–20 |
| water soluble salt selected from the group consisting of barium chloride, lithium carbonate and zinc acetate | .5–3 |

* * * * *

UNITED STATES PATENT AND TRADEMARK OFFICE
CERTIFICATE OF CORRECTION

PATENT NO. : 4,115,135
DATED : September 19, 1978
INVENTOR(S) : Friedrich Goeman It is certified that error appears in the above-identified patent and that said Letters Patent are hereby corrected as shown below:

Column 3, Line 31, underscore "in situ"; Column 10, Line 4, delete "comprising" and insert --comprises--.

Signed and Sealed this

Sixteenth Day of January 1979

[SEAL]

Attest:

RUTH C. MASON
*Attesting Officer*

DONALD W. BANNER
*Commissioner of Patents and Trademarks*